(12) United States Patent
Devos et al.

(10) Patent No.: US 6,540,921 B1
(45) Date of Patent: Apr. 1, 2003

(54) PROCESS FOR THE PURIFICATION OF AQUEOUS HYDROGEN PEROXIDE SOLUTIONS

(75) Inventors: Christine Devos, Paris (FR); Didier Demay, Paris (FR); Hervé Dulphy, Paris (FR)

(73) Assignee: L'Air Liquide Societe Anonyme a Directoire et Conseil de Surveillance pour l'Etude et l'Exploitation des Procedes Georges Claude, Paris (FR)

(*) Notice: Subject to any disclaimer, the term of this patent is extended or adjusted under 35 U.S.C. 154(b) by 144 days.

(21) Appl. No.: 09/690,853

(22) Filed: Oct. 18, 2000

(30) Foreign Application Priority Data

Oct. 27, 1999 (FR) .............................. 99 13435

(51) Int. Cl.⁷ ................................ C02F 1/42
(52) U.S. Cl. .................. 210/660; 210/691; 210/806; 210/263; 210/284; 423/584
(58) Field of Search .................. 210/660, 690, 210/691, 806, 263, 284; 423/584

(56) References Cited

U.S. PATENT DOCUMENTS 3,628,314 A   12/1971   McCarthy et al.
5,200,166 A * 4/1993   Shiga et al.
5,232,680 A * 8/1993   Honig et al.
5,397,475 A   3/1995   Millar et al.
5,624,655 A * 4/1997   Inaba et al.

FOREIGN PATENT DOCUMENTS

EP   0 774 442 A1   5/1997
EP   0 846 654 A1   6/1998
GB   1 592 394      7/1981

* cited by examiner

Primary Examiner—Betsey Morrison Hoey
(74) Attorney, Agent, or Firm—Burns, Doane, Swecker & Mathis, L.L.P.

(57) ABSTRACT

Process for the on-site purification of an aqueous hydrogen peroxide solution, in which the solution is made to pass through a resin bed capable, at least partially, of adsorbing or absorbing the impurities present in the solution. The hydrogen peroxide solution is injected into the resin bed and passes through the latter at an approximately linear velocity preferably of between 10 m/h and 50 m/h and more preferably between 10 m/h and 20 m/h, while the resin bed is kept substantially compacted for at least 50% of the time during which the solution is being purified by coming into contact with the said resin.

43 Claims, 4 Drawing Sheets

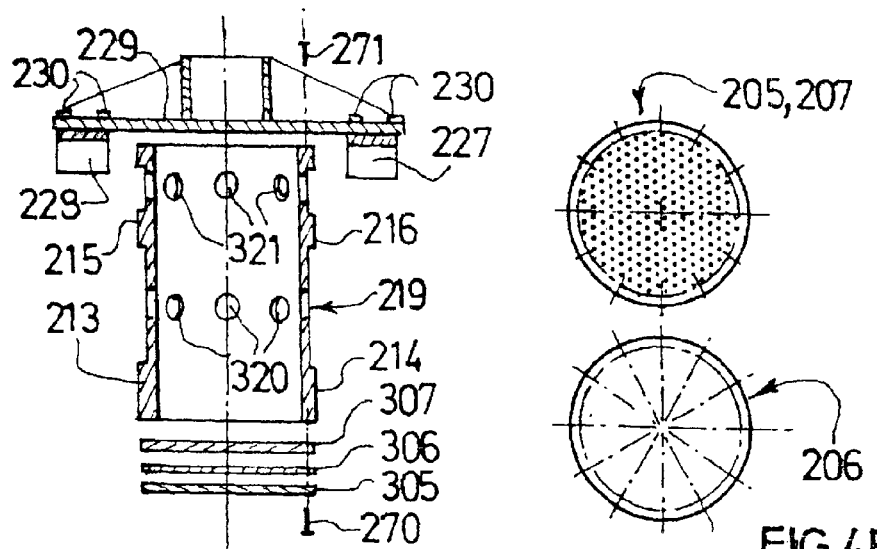
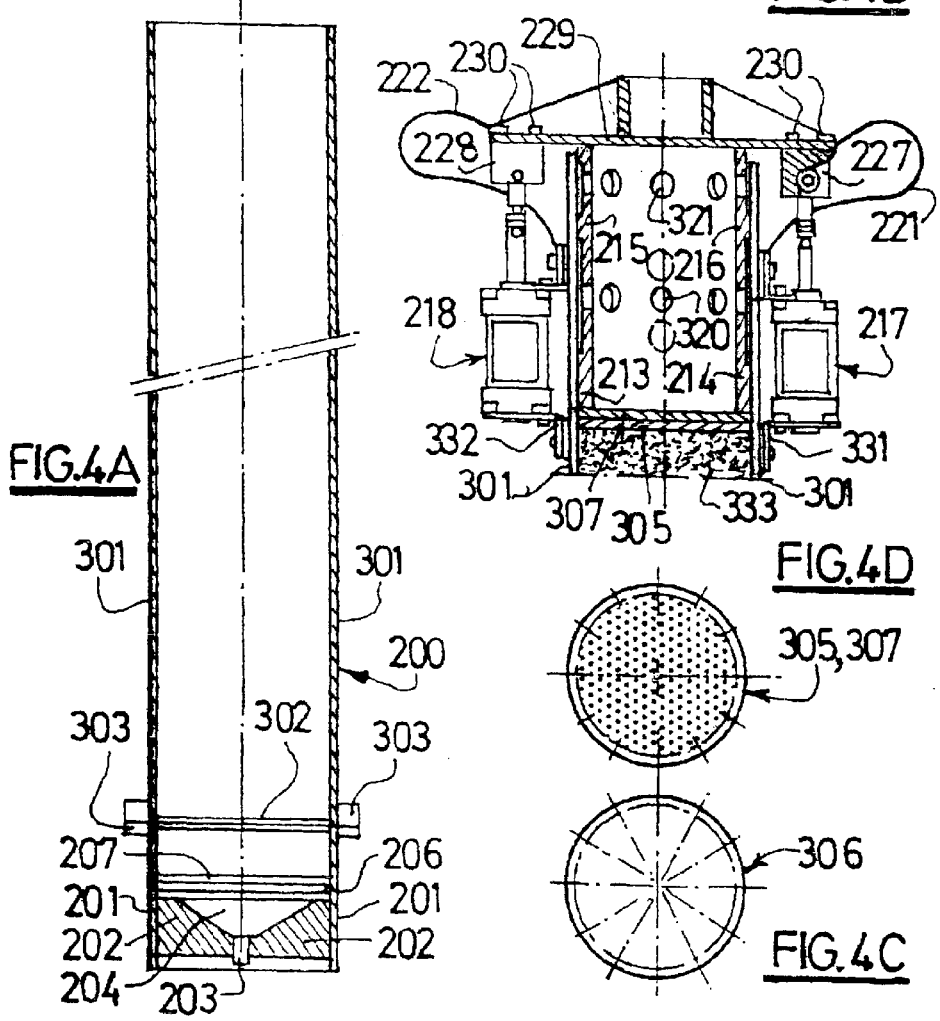

PROCESS FOR THE PURIFICATION OF AQUEOUS HYDROGEN PEROXIDE SOLUTIONS

This application claims priority under 35 U.S.C. §§119 and/or 365 to 99 13435 filed in France on Oct. 27, 1999; the entire content of which is hereby incorporated by reference.

BACKGROUND OF THE INVENTION

1. Filed of the Invention

The invention relates to a process for the purification of aqueous hydrogen peroxide solutions using ion-exchange resins. More particularly, the invention relates to a process for the production of aqueous hydrogen peroxide solutions containing very small amounts of impurities, especially metallic impurities, and intended for the fabrication of semiconductors, this production process being carried out very close to or at the point of use of the aqueous solution.

The invention also relates to a plant for producing aqueous hydrogen peroxide solutions containing very small amounts of impurities.

2. Description of the Related Art

Increasing the capacity of memories produced in the form of integrated circuits goes hand in hand with increasing purity of the chemicals used for the fabrication of chips on which these integrated circuits are produced.

Between 1985 and 1990, the capacity of on-chip memories was between 1 Mbits and 16 Mbits for an etching line thickness of between 1.5 $\mu$m and 0.8 $\mu$m, and required hydrogen peroxide solutions each with an impurity concentration that had to be less than 100 ppb.

At the present time, producing a 64 Mbit memory on a chip of the same size requires a line width of approximately 0.35 $\mu$m and in general uses a grade of hydrogen peroxide having a maximum degree of impurity for each impurity lying within the range from 0.1 to 1 ppb.

Semiconductor manufacturers hope in the near future to be able to market 256 Mbit and 1 Gigabit memories with a minimum etching geometry of less than 0.18 $\mu$m. The increase in memory capacity will then require a product for which the amount of each impurity will have to be less than 50 ppt.

Hydrogen peroxide is generally manufactured by autooxidation of an anthraquinone derivative or of a mixture of such derivatives. The said anthraquinone derivative(s) is (are) used dissolved in a complex mixture of organic solvents, such as an aromatic hydrocarbon mixed with an ester or an alcohol. This solution forms the working solution. This working solution is firstly hydrogenated in the presence of a catalyst, which converts the quinones into hydroquinones. It is then oxidized by bringing it into contact with air or with oxygen-enriched air. During this oxidation, the hydroquinones are oxidized, again, into quinones, with the simultaneous formation of hydrogen peroxide. The said hydrogen peroxide is extracted with water and the working solution undergoes a regeneration treatment before being used again.

The raw aqueous hydrogen peroxide solution is generally concentrated by rectification and purified in aluminium or stainless-steel distillation columns.

After this step, the aqueous hydrogen peroxide solution still contains impurities such as organic substances coming from the anthraquinone derivatives, solvents as well as degraded products from these compounds, and metallic elements such as aluminium, iron, chromium and zinc coming from the surface of the materials and pipes used.

This hydrogen peroxide solution must therefore undergo a subsequent treatment in order to achieve the degree of purity required by the semiconductor industry.

Various techniques may be used to purify such a solution, such as distillation, crystallization, passage over beds of adsorbent resins and/or ion exchanges, reverse osmosis, filtration, ultrafiltration, etc.

In general, the organic substances are well purified by a distillation process and/or a process involving an adsorbent resin. For more details about these processes, reference may be made to Patents FR-A-2,710,045, EP-A-835,842, EP-A-502,466 and/or FR-A-1,539,843. The metallic elements, present in not insignificant amounts for applications in microelectronics, as well as anions such as nitrates or sulphates for example, are generally removed by passage over beds of ion-exchange resins.

Various methods of purifying aqueous hydrogen peroxide solutions using ion-exchange resins have been proposed in the literature. In general, these methods comprise making the solutions come into contact with at least one highly acid cation-exchange resin, obtained by polymerization of styrene and crosslinking by divinylbenzene followed by a sulphuric acid treatment, as well as at least one highly basic anion-exchange resin, obtained by the reaction of a tertiary amine, for example trimethylamine, with polychloromethylstyrene.

In general, a person skilled in the art knows that the hydroxide form of the anionic resin is to be proscribed, since hydrogen peroxide very rapidly decomposes when in contact with it. The carbonate $CO_3^{2-}$ and bicarbonate $HCO_3^-$ forms of lower basicity may be used and are described, for example, in U.S. Pat. No. 3,294,488, U.S. Pat. No. 3,305,314 and/or U.S. Pat. No. 3,297,404.

However, the hydrogen peroxide decomposition reaction, when hydrogen peroxide comes into contact with this slightly basic support, is still possible, particularly if the hydrogen peroxide remains in static contact with the resin for several tens of minutes at room temperature.

Those skilled in the art know that this hydrogen peroxide decomposition reaction is accelerated by certain metals, such as iron and chromium, which may be contained in the resin itself and come from the materials used for its synthesis. For this purpose, special methods of preparing the resins before their use have been developed. Thus, JP-A-08,337,405 describes a process for treating anionic and cationic resins before use by an ultrapure aqueous solution of a mineral acid (for example, HCl). After this acid treatment, the resins are rinsed in ultrapure water. Next, the anionic resin is treated by an aqueous sodium hydroxide solution and then by a sodium carbonate or bicarbonate solution before being rinsed with ultrapure water. These treatments are generally lengthy and particular care has to be taken when carrying them out so as to avoid any contamination.

It is also known that hydrogen peroxide decomposition can gradually increase during purification of the said peroxide by the increase in metals picked up by the resin and carried away by the hydrogen peroxide solution itself. The addition of a mineral acid HX to the hydrogen peroxide solution before it comes into contact with the anionic resin, as described in U.S. Pat. No. 5,200,166, or with the cationic resin, as described in U.S. Pat. No. 5,534,238, makes it possible to reduce the evolution of oxygen due to hydrogen peroxide decomposition.

These methods have the drawback of considerably reducing the volume of hydrogen peroxide that can be purified per litre of resin. For example, in the case of anionic resins, sites are occupied by X, X being added in not insignificant amounts compared with the anionic mineral impurities contained in the hydrogen peroxide. This point is particularly important in the case of industrial plants intended for producing hydrogen peroxide. This is because, for the same volume of hydrogen peroxide, the amount of resin needed for purification will be greater if an HX resin is added to the hydrogen peroxide.

EP-A-846,654 discloses a process and an apparatus for purifying aqueous hydrogen peroxide solutions, in which the unpurified or partially purified solution flows under gravity through anionic and cationic resins. Because of the head losses due to the resins, the operating flow rate is limited because the flow is only created by gravity, thereby considerably reducing the production capacity. In this method of implementation, the cationic resin used is pretreated with an acid so as to remove the traces of metals.

Furthermore, the apparatus described does not benefit from a safety system allowing the unit to be rapidly shut down if the temperature in the latter rises abruptly, with a risk of explosion which must always be under control in hydrogen peroxide treatment units.

Thus, the on-site generation of extremely pure hydrogen peroxide remains a problem at the present time, even when prepurified hydrogen peroxide is used.

SUMMARY OF THE INVENTION

The subject of the present invention is a process for the additional purification of a hydrogen peroxide solution, especially of prepurified hydrogen peroxide, which does not have the disadvantages of the prior art and by virtue of which it is possible, without any danger, to produce an ultrapure-grade hydrogen peroxide intended for the semiconductor industry. According to a preferred version of the invention, the hydrogen peroxide solution is prepurified by distillation.

The invention relates more particularly to a process for the on-site purification of an aqueous hydrogen peroxide solution, in which the solution is made to pass through a resin bed capable, at least partially, of adsorbing or absorbing the impurities present in the solution, which process is characterized in that the hydrogen peroxide solution is injected into the resin bed and passes through the latter at an approximately linear velocity preferably of between 10 m/h and 50 m/h and more preferably between 10 m/h and 20 m/h and in that the resin bed is kept substantially compacted, preferably for at least 50% of the time during which the solution is being purified by coming into contact with the said resin.

According to the invention, preferably at least two columns are used, these being mounted in series and each containing an ion-exchange resin or an adsorbent resin (it is possible to have a single column, especially if the latter contains successive beds of anionic and/or cationic resins). Preferably, highly acid cationic resins, obtained by the sulphonation of a styrene-divinylbenzene copolymer, will be used. Also preferably, type-1 anionic resins will be used, these being obtained by the amination of a chloromethylstyrene-divinylbenzene copolymer, the ionic form of the resins being the carbonate or bicarbonate form. Advantageously, these resins are particularly oxidation-resistant.

The ion-exchange resins used will preferably consist of balls characterized by an approximately uniform diameter, thereby resulting in a coefficient of uniformity close to 1, the diameter of the said balls preferably being less than or equal to 700 $\mu$m. The particle size of the resin balls according to this preferred method of implementing the invention allows higher rates of exchange reaction than with conventional resins and therefore produces hydrogen peroxide solutions of very high purity.

According to another aspect of the invention, resins comprising less than 50 mg of iron and/or less than 10 mg of copper and/or less than 50 mg of aluminium per litre of dry resin will be used: it has in fact been found that these small-diameter resins having low concentrations of metallic elements, such as those described above, allow a particularly pure hydrogen peroxide to be obtained. In particular, it is thus possible to dispense with the acid pretreatment needed with the resins of the prior art before they are introduced into the purification column.

According to a preferred method of implementing the invention, use is made of an anionic resin and/or a cationic resin, these being located in beds placed sequentially in the same column or in separate columns.

Preferably, the anionic resin will be placed in the first column (first anionic purification), the cationic resin optionally being placed in the second column).

Preferably, the liquid will flow upwards through the columns, and particularly through the column which contains the anionic resin, so as to promote the removal of gases such as, for example, carbon dioxide which comes from exchange of the anions dissolved in the hydrogen peroxide with the carbonate or bicarbonate ions of the resin.

Advantageously, the apparatus according to the invention comprises a system for distributing the liquid at the bottom of each of the columns (of the funnel type, for example) so as to allow even distribution of the liquid over the cross section of the column. The formation of preferred paths in the column, which reduce the effectiveness of the purification, is thus avoided.

Advantageously, the apparatus according to the invention comprises a device which retains the resin balls in each of the columns so that the resin bed is not lifted up by the ascending flow of liquid. This device may furthermore make it possible to keep the resin compacted in the column by exerting a slight pressure on the bed.

In addition, this device constitutes a safety device. This is because, in the event of an overpressure in the column, the device is pushed back towards the outside of the column, allowing the resin bed to expand and releasing the gases, such as the oxygen formed by hydrogen peroxide decomposition, more rapidly. Thus, when this device is of the type consisting of a sliding cover in the column, as described in the figures below, this sliding cover has the double function of, on the one hand, keeping pressure on the resin so as to keep it compacted, according to the invention, and, on the other hand, being able to slide upwards and be ejected from the column in the event of an overpressure in the latter arising from decomposition of the hydrogen peroxide, thus providing a safety function.

According to a preferred aspect of the invention, it has been found that excellent hydrogen peroxide purification is obtained if, on the one hand, the velocity of the liquid passing through the resin bed (preferably upwards) is approximately linear (that is to say the velocity vector essentially has a vertical component, of approximately constant modulus to within the head losses) and, on the other hand, the resin bed through which the hydrogen peroxide passes is kept substantially compacted over a significant part of at least one of the resin beds used. The expression "substantially compacted" should be understood to mean that an additional force having a vertical component is exerted on each ball, in addition to the force resulting from the weight of the other balls lying above this ball. Preferably, this additional force may be applied for approximately the entire duration of implementation of the purification process.

According to another preferred characteristic, the liquid and/or gas in the columns is at a pressure close to atmospheric pressure. This is particularly important for the safety of the apparatus in the event of hydrogen peroxide decomposition; only the resin particles are exposed, at least partially, to a pressure greater than atmospheric pressure (at least partially compacted bed), while the liquid and/or gases are maintained at atmospheric pressure.

In order for the purification of hydrogen peroxide in solution to be carried out properly, the resin bed is kept substantially compacted for at least 50% of the time during which the solution is being purified by coming into contact with the said resin. This is because, when the resin particles are separated from each other (something which would generate a fluidized or partially fluidized resin bed), the efficiency of the purification greatly decreases, especially whenever less than approximately 50% of the purification takes place in contact with a compacted resin, that is to say a resin in which less than approximately 50% of the particles are in contact with each other (less than 50% of the purification taking place by contact with compacted resins may also mean, according to the invention, a resin bed for which, on average, over the entire height of the bed, less than 50% of the particles are in contact with each other, but also a succession of beds in which the first bed, for example, is in fluidized form and in which the second bed, for example, is in compacted form, or vice versa (in general, it may be considered that when at least some of the resin particles are substantially in contact with at least one other particle then the resin is substantially compacted).

Preferably, the resin bed is kept substantially compacted by applying pressure to the resin particles or balls forming the bed when the solution is injected upwards into the said bed in order to pass through it, at least partially.

The resin is, according to a preferred method, stored in a column and forms a bed of height h above which an approximately plane surface is placed at a distance d from the resin, the ratio d/h being kept under all circumstances less than approximately 0.1, preferably <0.05 and more preferably <0.01.

Preferably, a relative pressure of at least 100 pascals, preferably at least 200 pascals, will be applied to at least part of the (anionic and/or cationic) resin bed.

Preferably, the resin bed will consist of monospheres having diameters which are approximately identical to within 10%.

According to one version of the invention, in which the resin is placed in the form of a bed in one column, the solution is injected into the base of the said column using an injection nozzle which injects the liquid in a solid angle which substantially joins the walls of the column so as to inject the solution substantially over the entire cross section of the resin bed.

Preferably, the solution is injected into the resin bed via the lower part of the latter using a pumping system. It is also possible to provide several successive anionic and/or cationic resin beds.

According to one version, the apparatus according to the invention comprises several successive columns for purifying the solution, each having at least one anionic and/or cationic resin bed, the said beds being placed approximately at the same height.

Preferably, bubble traps are provided between the pumps and the point where the liquid is injected into the purification column.

According to one version of the invention, in order to provide greater safety, the temperature of the liquid in at least one resin bed is measured so as to detect any abnormal temperature rise which triggers the opening of a water circuit, causing the water to flood the resin bed. In one case, the water is generally injected into the base of the resin bed and rises up through the latter.

According to another version of the invention, nitrogen is injected above the resin bed. In general, the injected nitrogen will preferably have a so-called "electronic" purity adapted to the gas purity required in the fabrication of semiconductors, especially those which will be subsequently fabricated using the liquid solution. Preferably, the nitrogen will be injected into all the columns and the buffer tanks so as to prevent any contact between the ambient air and the liquid.

The liquid preferably flows from each column by overflow into a tank. The liquid is then pumped from this tank to the next column. When the tank is placed after the last column of the apparatus, the liquid may be pumped to the reject points or to a storage tank or to the top of the first column of the apparatus so as to circulate in a loop. Advantageously, the hydrogen peroxide solution circulates in a loop in order to allow the storage tank to be fed with the hydrogen peroxide solution to be purified or to allow the storage tank to be drained of the purified hydrogen peroxide solution. In this way, it is possible to avoid stoppages in the unit and therefore a reduction in production capacity.

A control system makes it possible to obtain a constant flow rate throughout the system. The specific flow rate is between $1\ h^{-1}$ and $10\ h^{-1}$ and more preferably between 10 and $20\ h^{-1}$.

The process is characterized in that it preferably operates continuously. When the system has to be shut down, for example for the operator to carry out maintenance operations, it is preferably rinsed with ultrapure water. The resistivity of the water used will preferably be greater than or equal to 18 MΩ.cm at 25° C.

Preferably, in order to avoid any risk of decomposition of the hydrogen peroxide in contact with the resins, the process of the invention is carried out at a temperature of between 0 and 25° C., preferably between 0 and 15° C. and even more preferably at a temperature substantially equal to about 5° C.

In order to avoid problems of resin degradation, the treated aqueous solutions are rarely aqueous hydrogen peroxide solutions containing more than 60% by weight of hydrogen peroxide. The solutions treated according to the invention are generally aqueous solutions which contain from 10 to 60% by weight of hydrogen peroxide. The process is most particularly suitable for the purification of aqueous solutions containing 30% by weight, especially those intended to be used in the electronics industry.

According to another aspect of the invention, a safety system is used which allows the resin bed to be rapidly flooded under a deluge of water, as mentioned above.

The safety system makes it possible, automatically or manually, for the resins to be very rapidly rinsed with water. Preferably, the resins will be rinsed when the flow of liquid is stopped or when the flow rate is less than 50% of the set flow rate because of a malfunction and when the hydrogen peroxide is liable to remain in contact with one of the resins. The device for making the unit safe consists of separate lines of larger diameter than the lines used for the hydrogen peroxide purification. Advantageously, the rinsing water will flow upwards through the columns.

Preferably, the deluging will be effected with very pure water available on the site so as not to introduce impurities and so as to be able to restart the system very rapidly after having repaired the anomaly. However, if ultrapure water is not available, the system will be rinsed with mains town water so as to make the plant safe. A device consisting of valves and sensors is used to switch from ultrapure water to mains town water.

In one version of the process, the town water may be replaced with a store of water, such as a pressurized container for example. Preferably, the volume of this container will be at least 10 times the total volume of the columns.

The unit preferably comprises pneumatic pumps supplied with compressed air. Should there be a break in the compressed-air supply, the pumps are then supplied with nitrogen, optionally "electronic"-grade nitrogen, until the compressed air is available again and for at most a time t set beforehand in the system for automatically managing the unit. After this time t, the unit will be rinsed with the deluge of water, as explained above.

The present invention also relates to a unit and an apparatus for the purification of an aqueous hydrogen peroxide solution containing organic and/or metallic impurities.

This apparatus preferably comprises:
  at least one column containing an anionic resin;
  at least one column containing a cationic resin;
  a tank containing the liquid, especially hydrogen peroxide, to be purified in contact with the resins;
  a pump, preferably a pneumatic pump, which makes it possible to send the liquid and the hydrogen peroxide into the bottom of the first column;
  preferably, a buffer tank and a pump which are placed after each column, the liquid level in each of these tanks being regulated.

The column containing the anionic resin is preferably placed before the column containing the cationic resin, the columns preferably being fed with an up flow.

Each of the columns of the said apparatus generally comprises:
  means which allow the resin balls to be kept compacted;
  means, placed at the bottom of the column, which allow good distribution of the liquid in the resin bed (for example, a funnel-shaped injection system);
  a line, at the bottom of the column, which allows the hydrogen peroxide solution or the rinsing water to flow;
  a line, at the top of the column, which allows the hydrogen peroxide solution or the rinsing water to flow out by overflow into a buffer tank.

BRIEF DESCRIPTION OF THE FIGURES OF THE DRAWING

The invention will be more clearly understood with the aid of the following illustrative examples, given by way of nonlimitation in conjunction with the figures, which show:

FIG. 4, an illustrative example of a column used in the apparatus described in FIG. 1.

DETAILED DESCRIPTION OF THE PREFERRED EMBODIMENTS

Figure 1:
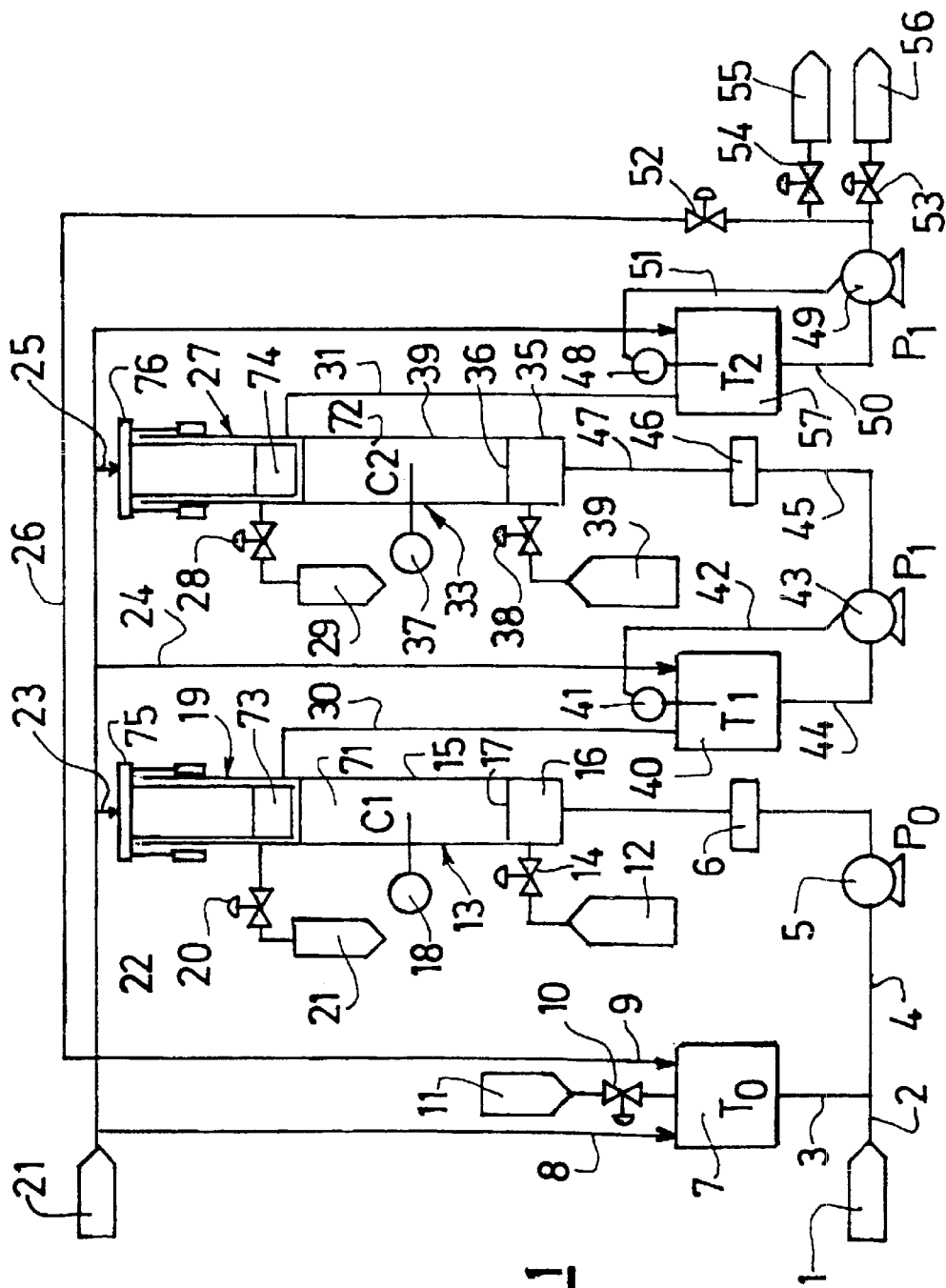
FIG. 1, a diagram describing the overall apparatus according to the invention.

In FIG. 1, a source 1 of deionized water DIW is connected via the line 2, on the one hand, to the line 3 which is itself connected to the storage container 7 (T0) and, on the other hand, to the line 4 which is itself connected to the pump 5 and then to the base of the column 13 via a bubble trap 6. The container 7 (T0) is supplied by a source 11 of hydrogen peroxide $H_2O_2$ via the valve 10 and also includes an inlet for injecting high-purity nitrogen coming from the high-purity nitrogen tank 21 via the supply line 8, the container 7 also being connected to the recycling line 9 downstream of the pump 49 via the valve 52 and the line 26. The column 13 has, at its base, a water deluging system 12 connected to the lower part 16 of the column 13 via a valve 14. A mesh 17 supports the resin bed 71 in its lower part, on which a moveable plate 73 bears so as to maintain a slight pressure (at least 100 pascals—relative pressure) on the resin according to the process of the invention, this moveable plate being fastened to the lower end of the sliding part 19 of the column, the upper part of which is closed by a cover 75 through which a pipe 23 for injecting ultrapure nitrogen coming from the nitrogen tank 21 may pass. Inside the body 15 of the column 13, lying within the resin bed, is a temperature probe 18 allowing the temperature to be monitored and the deluge 12 to be triggered if this temperature were to exceed a threshold set in advance. In the upper part of the column, above the moveable part 73, there is a drain 21 connected to an overflow of the upper part 19 of the column 13 (the overflow is not shown in the figure) via the valve 20, while the chemical liquid, such as hydrogen peroxide for example, filtered and purified over the resin bed 71 of the first column 13, flows via the line 30 into the tank 40 (T1), the abovementioned overflow allowing any excess liquid to be discharged if this liquid cannot flow in sufficient quantity into the line 30 and the storage tank 40.

This tank 40 (T1) receives the hydrogen peroxide purified in a first stage (for example by the resin 71 which may be only an anionic resin). This tank 40 has a level detector 41 which controls the operation of the pump 43 connected via the line 44 to the lower part of the tank 40, the said pump 43 delivering, via the line 45, the already partially purified chemical liquid to the bubble trap 46 which is itself connected via the line 47 to the bottom of the column 33 which may be identical to or different from the column 13. This column 33 also has in its lower part a deluge 39 connected via the valve 38 to the lower part 35 of the column 33 with a mesh 36 supporting the resin 72 in which a temperature probe 37 is located, while the moveable part 74 bears on this resin 72 and the moveable assembly 27 is closed in its upper part by a cover 76 in which a nitrogen injection pipe 25 connected to the nitrogen tank 21 is provided and in its lower part has, on the one hand, a line 31 for withdrawing the purified liquid from this second column 32 and an overflow system connected to a drain 29 via the valve 28. The line 31 is connected to a tank 57 (T2) which has a level detector 48 which is itself connected to a pump 49 and controls the latter so as to empty the tank 57 via the pipe 50. The output side of this pump 49 is connected, on the one hand, via the valve 54 to a tank 55 for storing the chemical liquid, such as hydrogen peroxide, and, on the other hand, to a drain system 56 via the valve 53 so as to be able to purge the system should the need arise and, finally, via the valve 52 to the tank 7 (T0).

Figure 2:
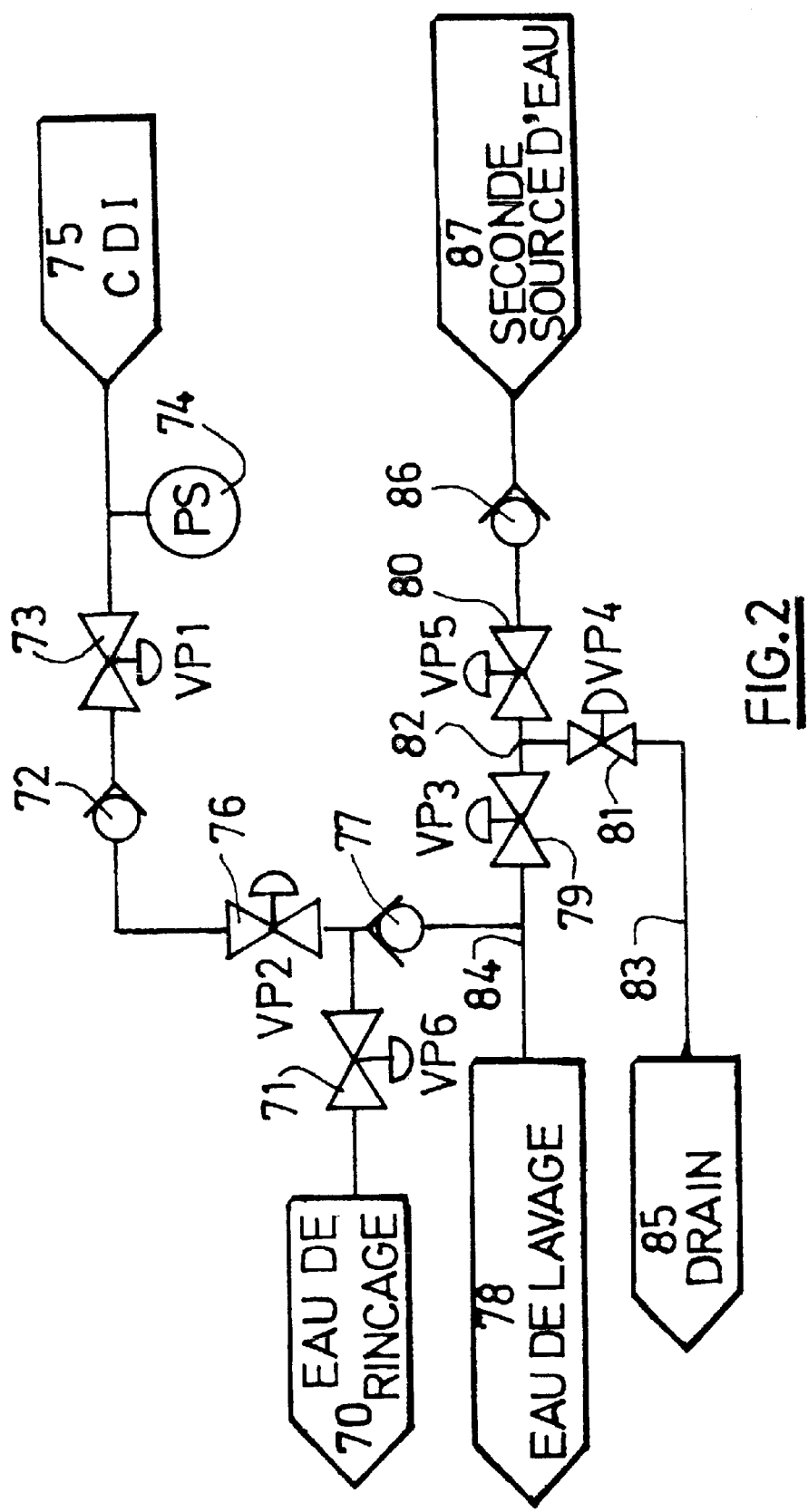
FIG. 2, a detailed diagram of the safety system of the apparatus according to the invention.

FIG. 2 describes briefly a safety system connected to the water deluge intended to flood the resin of a column of the system in FIG. 1 should, for example, the temperature exceed a set value. The water deluging system 78, that is to say for deluging with a large quantity of water, is connected, on the one hand, via the line 84 to the valve 79 VP3 and, on the other hand, via the non-return valve 77 to the valve 76 VP2, the other end of which is connected via the non-return valve 72 to the valve 73 VP1, the output side of which being connected to the reservoir of deionized water DIW 75, with a pressure measurement system 74 allowing the presence or absence of deionized water in the deionized-water reservoir 75 to be detected. The line 84 which supplies the deluging system is connected to one end of the valve 79 VP3, the other end of which is connected, on the one hand, to the valve VP4 81 which controls, via the line 83, the drain system 85 and, on the other hand, via the line 80 VP5 via the non-return valve 86 to a second water source 87 which may, for example, be a source of running water, intended to make up for the absence of deionized water should there be a temperature-rise problem. The rinsing water system 70 is connected via the valve 71 (VP6) to the common point between the valve 76 (VP2) and the non-return valve 77.

Figure 3:
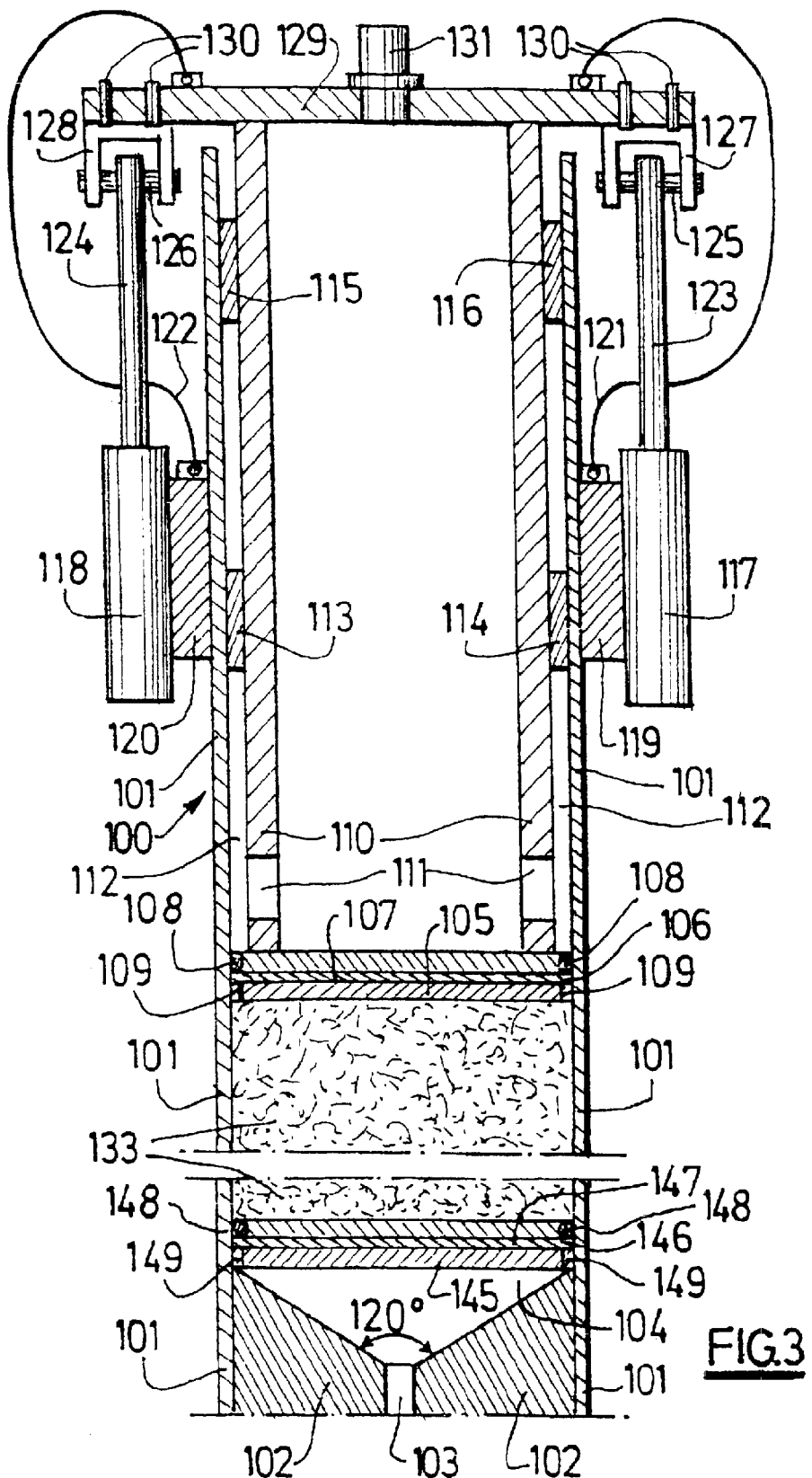
FIG. 3, a diagram showing the principle of a column for purification over a resin bed, comprising a system for maintaining pressure on the resin according to the invention.

FIG. 3 is a view showing the principle of the columns 13 and 33 of FIG. 1.

The overall column 100 comprises a preferably but not necessarily cylindrical shell 101 with a solid lower part, for example 102, placed axially in the centre of which there is a duct 103 which emerges in a funnel-shaped part 104, the angle of this funnel being, for example, about 120°. Placed above this funnel-shaped part, and approximately at the point where the end of the funnel 104 joins the shell 101, is a first perforated plate 145 having, around the periphery, a scraper seal 149 and then placed above this plate 145 is a filter 146 with meshes of the desired dimensions so as to retain the resin balls, and then lying on this filter 146 there is again a perforated plate 147, which may be identical or different to the plate 145, having, around its periphery, an O-ring seal 148 making it possible to ensure complete sealing between the funnel 104 and the inside of the column 100 containing the purifying resin 133. The plates 145, 147 and the filter 146 are generally fastened to the shell 101, that is to say they are fixed. The resin bed 133 occupies the desired height in the column 100. Placed above this bed is a moveable system of plates 105, 107 and of a filter 106 (these being of the same type or different from the assembly 145, 147, 146), this moveable system being fastened to the sliding part 110 of the column and having an O-ring seal 108 and a scraper seal 109.

The body 110 has, in its lower part, an opening in the form of a plurality of slots or orifices 111, allowing the liquid to flow out into 112. A system of blocks 113, 114, 115, 116 is provided around the body of the moveable part 110 so as to ensure that there is pressure on the resin 133 lying in the column, the said system of blocks allowing this moveable part to slide inside the shell 101 and to keep a constant pressure on the resin 133, the openings 111 ensuring, moreover, that the pressure on the liquid flowing in the column is approximately equal to the atmospheric pressure. The upper part of the moveable body 110 is closed by a disc 129 which has a central opening 131 for the optional injection of preferably ultrapure (so-called "electronic" grade) nitrogen and, around the periphery, has rupture bolts 130 connected to the cylinder 117 via a U-shaped piece 127, 128 connected to the rod 123, 124 of the cylinder 117, 118 by the pins 125, 126. A retaining cable 121, 122 is provided so that, if the bolts 130, which are calibrated in such a way that they break above a certain force exerted on them, happen to break, the upper part 129 is retained on the body 101 of the system to which the cylinders 117 and 118 are fixed by means of respective fixing pieces 119 and 120.

FIG. 4 shows a detailed illustrative example of the column shown schematically in FIG. 3. In this figure, the same elements as those in FIG. 3 having approximately the same function have the same reference numbers except that the first digit 1 in FIG. 3 is replaced by the digit 2 in FIG. 4 (thus, the body of the column 101 in FIG. 3 has become 201 in FIG. 4).

The body of the column 201 is closed at its bottom by a funnel-shaped solid part 202 through which is provided an orifice 203 lying along the axis of this cylindrical column 201. The funnel-shaped part 204 has an angle of about 120° and bears on the mesh 205 surmounted by the filter 206 which is itself surmounted by the mesh 207 as described in the previous figure. This body is extended in its upper part by an identical cylindrical part 201 connected at the bottom along the line 302 by a fixing system 303, the separation of the column 201 into two parts making it possible for the meshes 205, 207 and the filter 206 to be easily introduced into the solid bottom. This body 201 of the column 200 has a height which is about one metre, with a diameter of about 10 cm, the resin being placed inside this column 201 between the mesh 207 and the top of the column.

Placed at the top of this column is a moveable part 219 which comprises, in its lower part, a system of perforated meshes 305, 307 between which a filter 306 is placed, of the same type as or different from the system 205, 206, 207 described above. Essentially the perforated meshes comprise a plurality of holes distributed over the entire surface, while the filter 306, (like the filter 206) has pores of smaller diameter than the size of the resin balls. This meshes/filter assembly is fixed to the lower part of the moveable part 219 by a set of bolts 270, this moveable part having a number of blocks 213, 214, 215, 216 allowing this moveable part 219 to slide in the shell 201 of the column. The upper part of this moveable part is closed by a cylindrical part 229, placed around the periphery of which are U-shaped pieces 227, 228 connected to this upper part 229 by a set of bolts 230 (rupture bolts). The upper circular part 229 is fixed to the cylindrical part 219 by a set of bolts 271. Fixed to each of the pieces 227, 228 are cylinders 217, 218 allowing a calibrated pressure to be maintained on the moveable part 219 of the column according to the invention and thus allowing the assembly comprising the meshes 305, 307 to bear on the resin 333 and thus maintain a calibrated and constant pressure however the resin inside the body 201 of the column changes, especially when this resin swells during use and thus presses the perforated plate 305 upwards. The moveable part 219 has systems of perforations 320, 321 allowing passage and discharge of the liquid coming from the column, the liquid in normal operation after purification flowing out via the perforations 320, while the perforations 321 function as overflows, especially when the deluge in the column has been actuated. The cables 221 and 222 are cables for retaining the upper part 229 should the bolts 330 rupture due to the pressure of the resin on the plate 305. The bottom of the cylinders 217, 218 is fixed to the body 201 of the column at 331 and 332, respectively.

The operation of the device according to the invention, and in particular the system for maintaining pressure on the resin in the column, will now be explained below.

The resin balls are kept at the top of the column by a filter equipped with two seals—one of the scraper type and one of the O-ring type. This system provides good sealing so as to prevent the entrainment of resin balls out of the column.

In order to improve the effectiveness of the purification, it is important to work with a compacted bed. To do this, the top of the column is composed of a piston equipped with the filter described above and with two cylinders responsible for applying a constant holding force on the resin bed. These cylinders are preferably of the pneumatic type, the holding force being set by the pressure of the compressed air supplied to the cylinder. Preferably, for safety reasons, the cylinders are connected to the piston via rupture bolts so as to allow the piston to be completely disengaged in the event of decomposition of the hydrogen peroxide.

The bottom of each column is equipped with a liquid-distributing device, so that the liquid is distributed homogeneously over the cross section of the column.

Preferably, this device consists of a spray nozzle having a solid cone with a circular impact area. The spray angle is tailored to the circumference of the column and to the height separating the nozzle from the support for the filter which retains the resin.

The purification unit according to the invention will preferably include a safety system allowing the resins contained in the columns to be rinsed with water so as to remove the hydrogen peroxide therefrom in a very short time.

Each column is preferably provided with independent water inlet and outlet lines different from the lines which serve for the normal operation of the unit.

The inflow and outflow of water preferably take place via pneumatic valves which are normally open in the safety position. The unit will be put into the safety position when a risk of the hydrogen peroxide being immobilized on one of the resins has been detected or should there be an increase in the temperature of the liquid, especially in the columns or at the outlet of the latter. The safety position can also be adopted if there is a loss of electrical supply, a loss of compressed-air supply, a loss of monitoring and/or control of the apparatus or by the operator acting on an emergency stop button for a reason chosen by the operator.

The flow of rinsing water through the columns will preferably be greater than the normal operating flow in the unit. Preferably, the flow rate will be such that each resin is rinsed with at least 3 times its volume of water in less than 5 minutes.

This system is described in FIG. 2.

In the emergency position, when a dangerous situation has been detected, the valves VP1, VP2, VP3, VP5 are open, the valves VP4 and VP6 are closed and the deluge is then supplied with ultrapure water as long as the pressure of the ultrapure water is greater than the pressure of the second source of water (mains water).

If the pressure of the ultrapure water decreases, that is to say ultrapure water is no longer available, the deluge will be supplied via the second source of water.

In normal operation, the unit is supplied with ultrapure water, the valves VP1, VP2, VP4 and VP6 are open and the valves VP3 and VP5 are closed. The valve VP4 is opened so as to avoid any contamination of the deionized water DIW by water from the second source in the event of malfunction of the valve VP5.

The device preferably comprises a filter placed after the last column so as to lower the level of particles in the liquid. Preferably, the device comprises a sampling point placed after the last column. Samples are taken from a compartment with a flush of nitrogen, preferably of electronic grade, via a valve the opening of which is preferably controlled by foot, thereby allowing the operator to have both his hands available. This device makes sampling easier.

EXAMPLE 1

The plant described in FIG. 1 shows an example of how the present invention is carried out.

The unit is constructed from materials suitable for the production of ultrapure chemicals used in the electronics industry, such as high-density poly-ethylene, polytetrafluoroethylene, etc.

The column C1 contains an anionic resin such as, for example, that sold under the tradename "DOWEX MONOSHERE 550A LC NG" by the company DOW. The ionic form used is the $HCO_3^-$ form.

The column C2 contains a cationic resin such as the resin sold under the tradename "DOWEX MONOSHERE 500C NG" by the company DOW. The ionic form used is the $H^+$ form.

Each column is equipped with a device described above which allows the resin to be kept in place.

The hydrogen peroxide is stored in the tank 7 (T0). The opening of the supply valve is controlled by the level sensors placed on T0.

Next, the hydrogen peroxide is pumped by means of the pump 5 (P0) into the column C1 and passes upwards through it. The liquid flows under gravity into the tank 40 (T1) and is then pumped by means of the pump 43 (P1) upwards into the column C2. It flows out into the tank 57 (T2). Next, the liquid is pumped from T2 by means of the pump 49 (P2) in order to be sent to the reject points, or to a storage tank, to the point of use or into the storage T0.

The apparatus described above has been used as follows:

3000 litres of 30% distilled hydrogen peroxide are purified by passing them through the columns C1 and C2 at a flow rate of 2 l/min. The specific flow rate in each column is 15 $^{-1}$.

The table below gives the values of the main impurities in the hydrogen peroxide before and after purification.

| Impurity | Before purification | After purification |
| --- | --- | --- |
| Na | 170 ppb | <0.1 ppb |
| Ca | 14 ppb | <0.1 ppb |
| Fe | 4 ppb | <0.1 ppb |
| Al | 40 ppb | <0.1 ppb |
| NO3 | 5000 ppb | <10 ppb |
| Cl | 170 ppb | <10 ppb |

EXAMPLE 2

In accordance with this example, a comparison has been made between low flow rate and high flow rate of liquid chemical (e.g. H2O2) through the resin bed in order to demonstrate the criticality of the linear speed of chemical in accordance with the invention (linear speed preferably equal to or greater than 10 m/h)

C1 column is filled up with eight litres of anionic resin sold under the brand DOW A550 HCO3, C2 column is filled up with eight litres of cationic resin sold under the brand DOW C650.

In both column, the liquid chemical flows from the bottom to the top. The results obtained after purification at different flow rates from an unpurified H2O2 are summarized in the following table 1:

TABLE 1

| | Concentration of impurities (ppt) in $H_2O_2$ | Concentration of impurities (ppt) in $H_2O_2$ after purification | |
|---|---|---|---|
| | before purification | Flow rate = 150 l/h | Flow rate = 20 l/h |
| Na | 170000 | 20 | 700 |
| Al | 40000 | 20 | 150 |
| Fe | 3700 | 35 | 60 |
| Ca | 13500 | 5 | 200 |
| Sn | <6000 | 200 | 3800 |

Table 2 hereinbelow indicates the flow rate v. linear speed in the resin.

| Flow rate l/h | Linear Speed M/h |
|---|---|
| 150 l/h | 19 |
| 20 l/h | 3 |

What is claimed is:

1. Process for the on-site purification of an aqueous hydrogen peroxide solution, comprising passing the solution through a resin bed capable, at least partially, of adsorbing or absorbing the impurities present in the solution, wherein the hydrogen peroxide solution is injected into the resin bed and passes through the bed at an approximately linear velocity of between 10 m/h and 50 m/h, and wherein the resin bed is kept substantially compacted for at least 50% of the time during which the solution is being purified by coming into contact with the resin.

2. Process according to claim 1, wherein the resin bed is kept substantially compacted by applying pressure to a plurality of resin balls forming the bed when the solution is injected upwards into the bed in order to pass through it, at least partially.

3. Process according to claim 2, wherein the pressure applied to the resin is at least 100 pascals (relative pressure).

4. Process according to claim 3, wherein the pressure applied to the resin is at least 200 pascals (relative pressure).

5. Process according to claim 2, wherein the resin is stored in a column and forms a bed of height h above which an approximately planar surface is placed at a distance d from the resin, the ratio d/h being kept under all circumstances less than approximately 0.1.

6. Process according to claim 5, wherein d/h<0.05.

7. Process according to claim 5, wherein d/h<0.01.

8. Processing according to claim 2, wherein the resin bed is located in a column, and wherein the liquid and/or gas pressure in the column is equal or close to atmospheric pressure.

9. Process according to claim 2, wherein the approximately linear velocity of the solution is substantially vertical, directed upwards.

10. Process according to claim 2, wherein the resin bed comprises at least one resin comprising spheres having a diameter of less than approximately 700 microns.

11. Process according to claim 10, wherein the resin bed comprises monospheres having diameters which are approximately identical to within 10%.

12. Process according to claim 2, wherein at least one of the resins forming the resin bed comprises less than 50 mg of iron, 10 mg of Cu and/or 50 mg of aluminum per litre of dry resin.

13. Process according to claim 2, wherein with the resin being placed in the form of a bed in a column, the solution is injected into the base of the column using an injection nozzle which injects the solution in a solid angle which substantially joins the walls of the column so as to inject the solution substantially over the entire cross section of the resin bed.

14. Process according to claim 2, wherein the solution is injected into the resin bed at the lower part of the latter using a pumping system.

15. Process according to claim 14, comprising a plurality of successive columns for purifying the solution, each having at least one anionic and/or cationic resin bed, the beds being placed approximately at the same height.

16. Process according to claim 2, wherein a plurality of successive anionic and/or cationic resin beds are provided.

17. Process according to claim 2, wherein the temperature of the solution in the bed is measured so as to detect a predetermined temperature rise which triggers the opening of a water circuit, causing the water to flood the resin bed.

18. Process according to claim 17, wherein the water is injected into the base of the resin bed and rises up through the bed.

19. Process according to claim 2, wherein nitrogen is injected above the resin bed.

20. Process according to claim 19, wherein the injected nitrogen has an electronic purity adapted to the gas purity required in the fabrication of semiconductors.

21. Process according to claim 1, wherein the resin is stored in a column and forms a bed of height h above which an approximately planar surface is placed at a distance d from the resin, the ratio d/h being kept under all circumstances less than approximately 0.1.

22. Process according to claim 21, wherein d/h<0.05.

23. Process according to claim 21, wherein d/h<0.01.

24. Process according to claim 21, wherein the pressure applied to the resin is at least 100 pascals (relative pressure).

25. Apparatus according to claim 24, wherein the pressure applied to the resin is at least 200 pascals (relative pressure).

26. Process according to claim 1, wherein the resin bed is located in a column, and wherein the liquid and/or gas pressure in the column is equal or close to atmospheric pressure.

27. Process according to claim 1, wherein the approximately linear velocity of the solution is substantially vertical, directed upwards.

28. Process according to claim 1, wherein the resin bed comprises at least one resin comprising spheres having a diameter of less than approximately 700 microns.

29. Process according to claim 28, wherein the resin bed comprises monospheres having diameters which are approximately identical to within 10%.

30. Process according to claim 1, wherein at least one of the resins forming the resin bed comprises less than 50 mg of iron, 10 mg of Cu and/or 50 mg of aluminum per litre of dry resin.

31. Process according to claim 1, wherein with the resin being placed in the form of a bed in a column, the solution is injected into the base of the column using an injection nozzle which injects the solution in a solid angle which substantially joins the walls of the column so as to inject the solution substantially over the entire cross section of the resin bed.

32. Process according to claim 1, wherein the solution is injected into the resin bed at the lower part of the latter using a pumping system.

33. Process according to claim 32, comprising a plurality of successive columns for purifying the solution, each having at least one anionic and/or cationic resin bed, the beds being placed approximately at the same height.

34. Process according to claim 32, wherein the pumping system comprises a pump, and wherein a bubble trap is provided between the pump and the point of injection into the column.

35. Process according to claim 1, wherein a plurality of successive anionic and/or cationic resin beds are provided.

36. Process according to claim 1, wherein the temperature of the solution in the bed is measured so as to detect a predetermined temperature rise which triggers the opening of a water circuit, causing the water to flood the resin bed.

37. Process according to claim 36, wherein the water is injected into the base of the resin bed and rises up through the bed.

38. Process according to claim 1, wherein nitrogen is injected above the resin bed.

39. Process according to claim 38, wherein the injected nitrogen has an electronic purity adapted to the gas purity required in the fabrication of semiconductors.

40. Process according to claim 1, wherein the hydrogen peroxide solution is injected into the resin bed and passes through the bed at an approximately linear velocity of between 10 m/h and 20 m/h.

41. Apparatus for the on-site purification of hydrogen peroxide comprising:

at least one column containing an anionic resin;

at least one column containing a cationic resin;

a tank containing a liquid comprising hydrogen peroxide, to be purified in contact with the resins;

a pump which makes it possible to send the liquid into the bottom of either the column containing an anionic resin or the column containing a cationic resin.

42. Apparatus according to claim 41, further comprising a buffer tank and a second pump which are placed after each column, the liquid level in each of these tanks being regulated.

43. Apparatus according to claim 41, wherein the pump is a pneumatic pump.

* * * * *